US009769712B2

(12) United States Patent
Liang et al.

(10) Patent No.: US 9,769,712 B2
(45) Date of Patent: Sep. 19, 2017

(54) CIRCUIT-SWITCHED FALLBACK WITH IMPROVED RELIABILITY IN POOL OVERLAP AREAS

(71) Applicant: Apple Inc., Cupertino, CA (US)

(72) Inventors: Huarui Liang, Beijing (CN); Zhiwei Wang, Beijing (CN); David Boettger, San Jose, CA (US); Dawei Zhang, Saratoga, CA (US); Farouk Belghoul, Campbell, CA (US); Krisztian Kiss, Hayward, CA (US)

(73) Assignee: Apple Inc., Cupertino, CA (US)

( * ) Notice: Subject to any disclaimer, the term of this patent is extended or adjusted under 35 U.S.C. 154(b) by 111 days.

(21) Appl. No.: 14/790,041

(22) Filed: Jul. 2, 2015

(65) Prior Publication Data

US 2016/0014642 A1 Jan. 14, 2016

Related U.S. Application Data

(60) Provisional application No. 62/023,206, filed on Jul. 11, 2014.

(51) Int. Cl.
*H04W 36/00* (2009.01)
*H04W 36/14* (2009.01)

(52) U.S. Cl.
CPC ........ *H04W 36/0022* (2013.01); *H04W 36/14* (2013.01)

(58) Field of Classification Search
CPC .................................. H04W 36/0022
See application file for complete search history.

(56) References Cited

U.S. PATENT DOCUMENTS

| 6,735,184 | B1 * | 5/2004 | Davidson | ........... H04B 7/18584 370/316 |
| 2007/0238461 | A1 * | 10/2007 | Lundin | ................... H04W 8/12 455/436 |
| 2010/0080171 | A1 * | 4/2010 | Rune | .................... H04J 11/0069 370/328 |

(Continued)

FOREIGN PATENT DOCUMENTS

WO 2009081268 A1 7/2009

OTHER PUBLICATIONS

International Search Report & Written Opinion, Application No. PCT/US2015/039047, mailed Sep. 16, 2015, 16 pages.

*Primary Examiner* — Charles C Jiang
*Assistant Examiner* — Thad Defauw
(74) *Attorney, Agent, or Firm* — Meyertons Hood Kivlin Kowert & Goetzel, P.C.; Jeffrey C. Hood

(57) ABSTRACT

Performing a circuit-switched fallback (CSFB) call with improved reliability. A request to establish a CSFB call may be received by a UE that is currently in a pool overlap area. The network resource controller, or the base station, transmits information to the UE which indicates the pools in which neighboring cells are operating. The UE uses this information to select a circuit-switched cell on which to operate for the CSFB operation, wherein the selected CS cell is in the same pool area as the current pool area. This prevents the UE from inadvertently camping on a CS cell in a different pool area, which could cause call failure on some networks. The information provided by the base station may comprise a pool area id, or may comprise mapping relation information that is useable by the UE to determine the current pool area.

20 Claims, 12 Drawing Sheets

(56) References Cited

U.S. PATENT DOCUMENTS

| | | | |
|---|---|---|---|
| 2010/0303041 A1* | 12/2010 | Diachina | H04W 36/14 |
| | | | 370/331 |
| 2010/0317347 A1* | 12/2010 | Burbidge | H04W 36/0088 |
| | | | 455/436 |
| 2013/0258888 A1 | 10/2013 | Jeong et al. | |
| 2013/0301466 A1 | 11/2013 | Nenner | |
| 2014/0113636 A1 | 4/2014 | Lee et al. | |
| 2014/0314046 A1 | 10/2014 | Jung et al. | |
| 2015/0117401 A1 | 4/2015 | Jiang et al. | |

* cited by examiner

CIRCUIT-SWITCHED FALLBACK WITH IMPROVED RELIABILITY IN POOL OVERLAP AREAS

PRIORITY INFORMATION

This application claims priority to U.S. provisional patent application Ser. No. 62/023,206, entitled "Circuit-Switched Fallback With Improved Reliability in Pool Overlap Areas," filed Jul. 11, 2014, which is hereby incorporated by reference in its entirety as though fully and completely set forth herein.

FIELD OF THE INVENTION

The present application relates to wireless devices, and more particularly to a system and method for establishing a circuit-switched fallback call with improved reliability.

DESCRIPTION OF THE RELATED ART

Wireless communication systems are rapidly growing in usage. Further, wireless communication technology has evolved from voice-only communications to also include the transmission of data, such as Internet and multimedia content. As wireless communication systems evolve, successive generations of wireless communication technologies tend to be developed. Adoption of a new generation wireless technology may be a gradual process, during which one or more previous generations of a similar technology may co-exist with the new generation technology, e.g., for a period of time until the new generation wireless technology is fully deployed.

One example of a transition to a next generation in wireless technology is the transition from GSM and UMTS to LTE. LTE utilizes a fully packet-switched network, and does not provide circuit-switched services. UMTS provides circuit-switched services and packet-switched services. GSM initially provided only circuit-switched services, but was later enhanced to provide some packet-switched services as well. A transitional technique in the migration to LTE is the circuit-switched fallback (CSFB) call. In this case, when a wireless device is registered on a CSFB capable LTE network and a circuit-switched call is initiated, the wireless device is redirected to a 2G/3G network that can support the circuit-switched call.

Accordingly, improvements in wireless communications, specifically in the handling of CSFB calls, would be desirable. In particular, it would be desirable to improve the reliability of CSFB calls.

SUMMARY OF THE INVENTION

In light of the foregoing and other concerns, it would be desirable to provide a way for wireless user equipment (UE) devices to perform circuit-switched fallback (CSFB) calls with improved reliability.

When a circuit-switched call is initiated (e.g., received) at a wireless device which is camped on a packet-switched network that does not provide circuit switched services (e.g., an LTE network), and which is capable of supporting circuit-switched fallback, the UE may be redirected to fall back to a circuit-switched network (e.g., UTMS) which does provide circuit switched services. However, during CSFB when the UE is currently camped on a cell in a first pool, if the UE is in a pool overlap area the UE might inadvertently choose to camp on a cell of a different MSC (Mobile Switching Center) pool when transitioning to the circuit-switched network. This may cause the UE to attach to a different MSC server, and hence may cause the call to fail if MTRF (Mobile Terminating Roaming Forwarding) has not been deployed in the network. Therefore, various methods are disclosed herein which provide the UE with information sufficient for it to select an appropriate cell on the same pool in which it has been operating and hence the same MSC server, to avoid call failure.

In various embodiments, the UE knows or is provided with information identifying the current pool on which it is camped. For example, the UE may know its current pool, e.g., its pool id, from its own TMSI (Temporary Mobile Station Identification). In some embodiments, the UE is also provided with pool information regarding other neighboring candidate cells. The pool information may comprise pool id's of each of the various candidate cells. In some operator networks, the pool id for a cell is part of the network resource identification (NRI), e.g. the NRI bitfield comprises one or more bits specifying the pool id. In a first embodiment, a Base Station Subsystem/Radio Network Controller (BSS/RNC) receives and stores the pool id's from the various candidate cells, e.g., received from an OAM server or the respective MSC servers. The BSS/RNC then broadcasts (transmits) these pool id's to the UE either prior to or during a CSFB operation. In another embodiment, the base station receives the pool id's of these candidate cells from the BSS/RNC, or from the OAM server or respective MSC servers. The base station then may transmit these pool id's to the UE. For example, the base station, the eNodeB, may transmit the pool id's to the UE in an RRC release message during the CSFB operation. In other embodiments, the UE may be provided with other information to identify the MSC server(s) to which the various candidate cells are currently attached, such as an MSC address or other information for each MSC server.

When the UE receives a mobile terminating (MT) (incoming) call and performs a CSFB operation, the UE may perform cell selection to select a new CS cell on which to camp. The UE knows the current pool id it is camped on. The UE may have also received cell frequency/pool id information for a plurality of other cells from either the BSS/RNC or the base station. The BSS/RNC may in turn have received this information from an OAM server, which has gathered this information from various MSC servers. Alternatively, the UE may receive cell frequency/pool id information from an over the air (OTA) server, or possibly various ones of the different neighboring candidate cells. For each respective candidate cell, the information received by the UE may include an identification of the candidate cell (e.g., the frequency of the cell), and also the pool id for the respective candidate cell, among other possible information.

When the UE receives this information (cell frequency/pool id) regarding the various possible candidate cells, the UE may store each of the candidate cell's frequency and corresponding pool id in a memory, such as in a data structure. When the UE is searching for a new cell, the UE can then compare the pool id on which it is currently camped with the pool id's of these candidate cells. Thus the UE uses this information to select a candidate cell belonging to the same pool (having the same pool id) on which it was camped prior to the CSFB operation. This operates to prevent a call failure that would result if the UE camped on a different MSC pool and hence attached to a different MSC server, and MTRF was unavailable. This helps to prevent a call failure from lack of MTRF deployment.

Accordingly, embodiments are presented herein of a method for performing a CSFB call and a UE and base station, or other cellular networking hardware (BSS/RNC), configured to implement the method. The UE, base station and other hardware may include one or more radios, including one or more antennas, for performing wireless communications with each other The UE and/or base station may also include device logic (which may include a processor and memory medium and/or hardware logic) configured to implement the method. Embodiments are also presented of a memory medium (e.g., a non-transitory computer accessible memory medium) storing program instructions executable by a processor to perform part or all of the method.

BRIEF DESCRIPTION OF THE DRAWINGS

A better understanding of the present invention can be obtained when the following detailed description of the embodiments is considered in conjunction with the following drawings.

Figure 1:
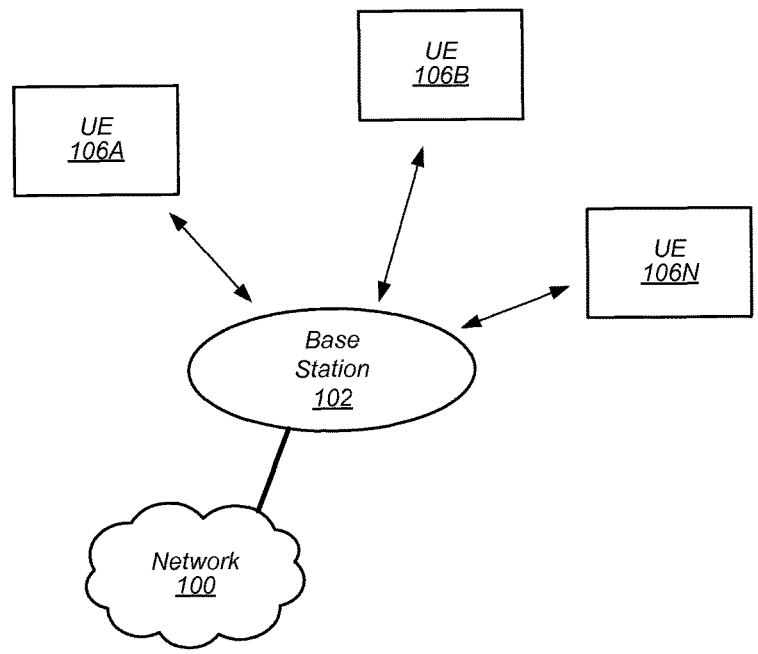
FIG. 1 illustrates an exemplary (and simplified) wireless communication system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present Patent Application:
UE: User Equipment
BS: Base Station
ENB: eNodeB (Base Station)
GSM: Global System for Mobile Communication
UMTS: Universal Mobile Telecommunication System
LTE: Long Term Evolution
CS: Circuit-switched
PS: Packet-switched
CSFB: Circuit-switched fallback
MME: Mobile Management Entity
MSC: Mobile Switching Center
RNC: Radio Network Controller
OAM: Operations, Administration, and Management
RRC: Radio Resource Control
MT: Mobile Terminating
MTRF: Mobile Terminating Roaming Forwarding

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which performs wireless communications. Examples of UE devices include mobile telephones or smart phones (e.g., iPhone™, Android™-based phones), wearable devices (such as a smart watch), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is capable of wireless communication. UE devices may commonly be mobile or portable and easily transported by a user, though in some cases substantially stationary devices may also be configured to perform wireless communication.

Channel—a medium used to convey information from a sender (transmitter) to a receiver. It should be noted that since the definition of the term "channel" may differ according to different wireless protocols, the term "channel" as used herein should be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
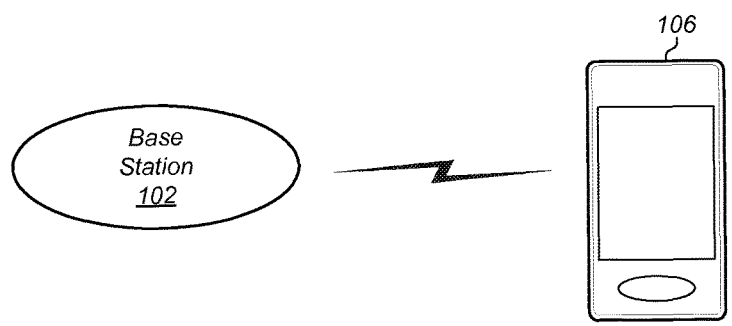
FIG. 2 illustrates a base station in communication with user equipment, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments of the invention may be implemented in any of various systems, as desired.

As shown, the exemplary wireless communication system includes a base station 102 which communicates over a transmission medium with one or more user devices 106-1 through 106-N. Each of the user devices may be referred to herein as a "user equipment" (UE). Thus, the user devices 106 are referred to as UEs or UE devices.

The base station 102 may be a base transceiver station (BTS) or cell site, and may include hardware that enables wireless communication with the UEs 106A through 106N. The base station 102 may also be equipped to communicate with a network 100. Thus, the base station 102 may facilitate communication between the UEs and/or between the UEs and the network 100. The communication area (or coverage area) of the base station may be referred to as a "cell." The base station 102 and the UEs may be configured to communicate over the transmission medium using any of various wireless communication technologies such as GSM, UMTS, LTE, CDMA, WLL, WAN, WiFi, WiMAX, etc. Base station 102 and other similar base stations operating according to the same or a different cellular communication standard may thus be provided as a network of cells, which may provide continuous or nearly continuous overlapping service to UE 106 and similar devices over a wide geographic area via one or more cellular communication standards.

In some embodiments, UE 106 may be capable of communicating using multiple wireless communication standards. For example, the UE 106 might be configured to communicate using two or more of GSM, UMTS, LTE, CDMA200, WiMAX, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106-1 through 106-N) in communication with the base station 102, according to some embodiments. As defined above, the UE 106 may be a device with wireless network connectivity such as a mobile phone, a hand-held device, a computer or a tablet, or virtually any type of wireless device.

The UE may include a processor that is configured to execute program instructions stored in memory. The UE may perform any of the methods embodiments described herein by executing such stored instructions. In some embodiments, the UE may include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple wireless communication protocols as described above. The UE 106 may include one or more antennas for communicating using one or more wireless communication protocols. In some embodiments, the UE 106 may share one or more parts of a receive and/or transmit chain between multiple wireless communication standards. The shared radio may include a single antenna, or may include multiple antennas (e.g., for MIMO) for performing wireless communications. In other embodiments, the UE 106 may include separate transmit and/or receive chains (e.g., including separate antennas and other radio components) for each wireless communication protocol with which it is configured to communicate. In still other embodiments, the UE 106 may include one or more radios which are shared between multiple wireless communication protocols, and one or more radios which are used exclusively by a single wireless communication protocol. For example, in one set of embodiments, the UE 106 may include a shared radio for communicating using either of LTE or 1×RTT, and separate radios for communicating using each of Wi-Fi and Bluetooth. Other configurations are also possible.

In some embodiments, the UE 106 may be configured to establish and perform a circuit-switched fallback (CSFB) call. For example, the UE 106 might be configured to communicate using either of a first wireless communication technology which provides packet-switched (PS) services but not circuit-switched (CS) services and a second wireless communication technology which provides PS services and CS services. If the UE 106 is using the first wireless communication technology and a CS call is initiated or received, the UE 106 may be capable of switching to use of the second wireless communication technology in order to establish the call.

In particular, in one set of embodiments, the UE 106 may be configured to perform a CSFB call in a manner that advantageously improves reliability by ensuring that the UE selects the appropriate cell when it is in a pool overlap area, as further described hereinbelow.

Figure 3:
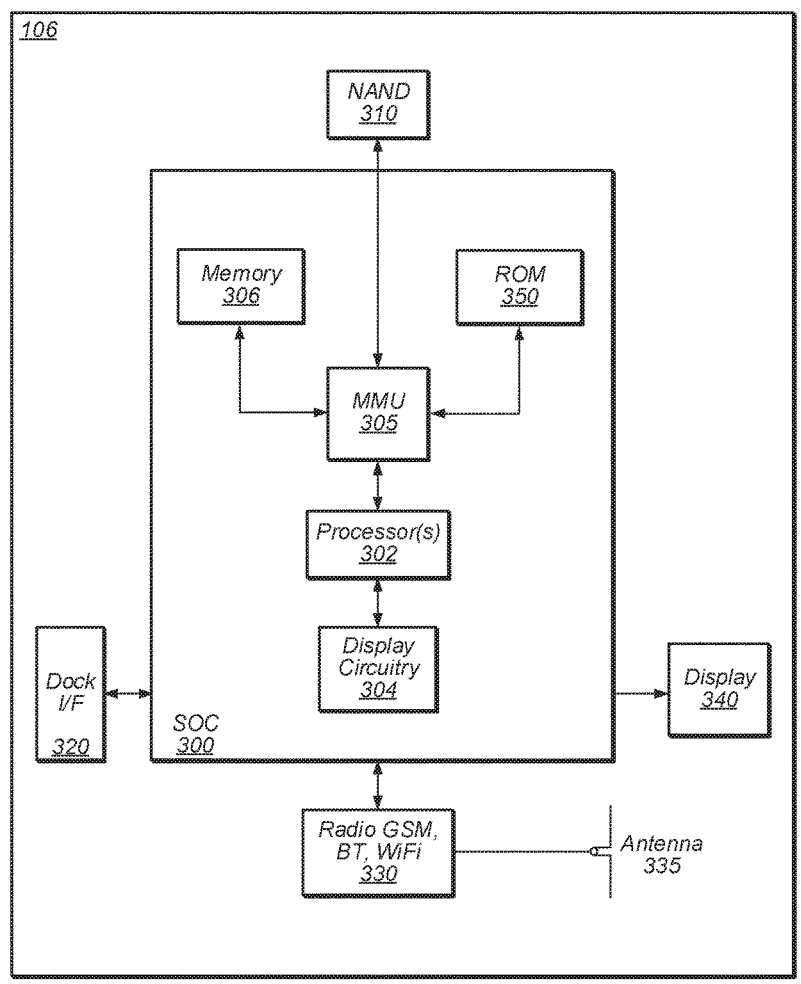
FIG. 3 illustrates an exemplary block diagram of a UE, according to some embodiments.

FIG. 3—Example Block Diagram of a UE

FIG. 3 illustrates an example block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 340. The processor(s) 302 may also be coupled to memory management unit (MMU) 305, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 340. The MMU 305 may be configured to perform memory protection and page table translation or set up. In some embodiments, the MMU 305 may be included as a portion of the processor(s) 302.

In the embodiment shown, ROM 350 may include a bootloader, which may be executed by the processor(s) 302 during boot up or initialization. As also shown, the SOC 300 may be coupled to various other circuits of the UE 106. For example, the UE 106 may include various types of memory (e.g., including NAND flash 310), a connector interface 320 (e.g., for coupling to the computer system), the display 340, and wireless communication circuitry (e.g., for LTE, CDMA2000, Bluetooth, WiFi, etc.).

The UE device 106 may include at least one antenna, and in some embodiments multiple antennas, for performing wireless communication with base stations and/or other devices. For example, the UE device 106 may use antenna 335 to perform the wireless communication. As noted above, the UE may be configured to communicate wirelessly using multiple wireless communication standards in some embodiments.

As described herein, the UE 106 may include hardware and software components for implementing a method for performing a CSFB call according to embodiments of this disclosure.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

Figure 4:
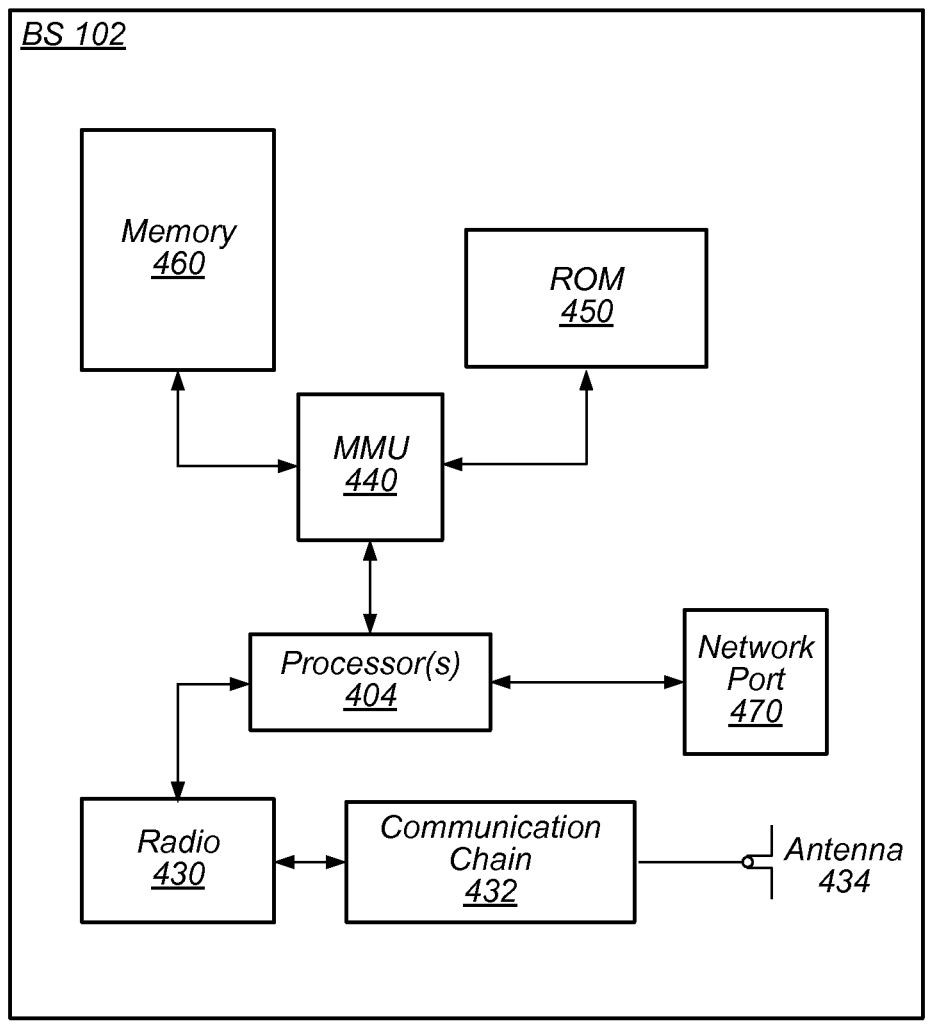
FIG. 4 illustrates an exemplary block diagram of a UE, according to some embodiments.

FIG. 4—Base Station

FIG. 4 illustrates an exemplary block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices 106 serviced by the cellular service provider).

The base station 102 may include at least one antenna 434. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various RATs, including, but not limited to, GSM, UMTS, LTE, WCDMA, CDMA2000, etc.

The processor(s) 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

Figure 5:
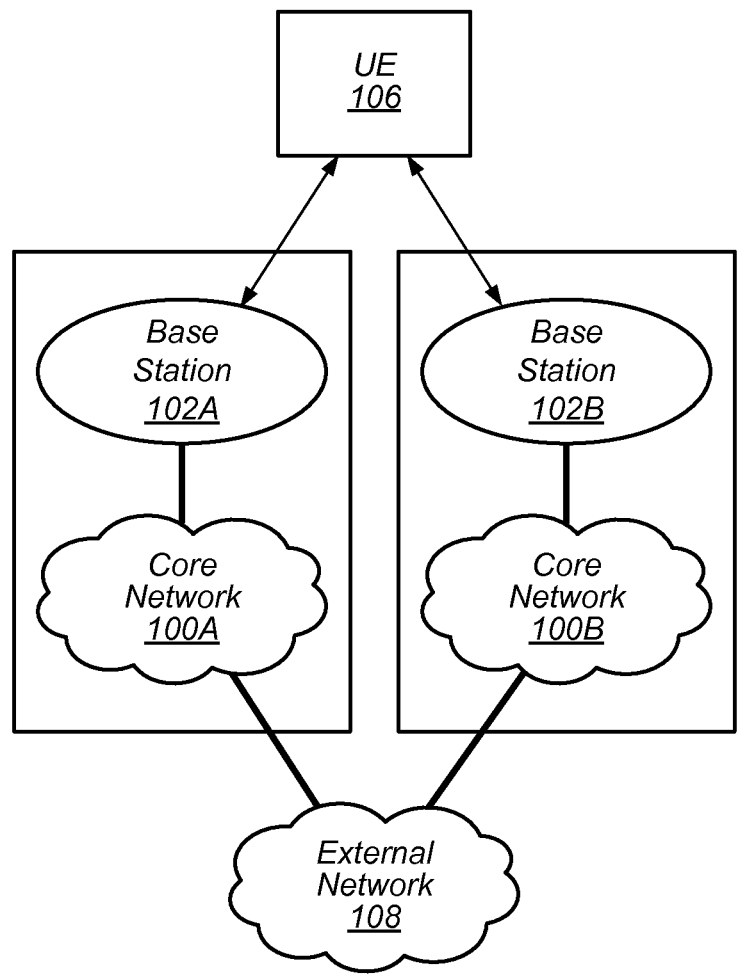
FIG. 5 is a block diagram of an example cellular communication network, according to some embodiments.

FIG. 5—Communication System

FIG. 5 illustrates an exemplary (and simplified) wireless communication system, according to some embodiments. It is noted that the system of FIG. 5 is merely one example of a possible system, and embodiments may be implemented in any of various systems, as desired.

As shown, the exemplary wireless communication system includes base stations 102A and 102B which communicate over a transmission medium with one or more user equipment (UE) devices, represented as UE 106. The base stations 102 may be base transceiver stations (BTS) or cell sites, and may include hardware that enables wireless communication with the UE 106. Each base station 102 may also be equipped to communicate with a core network 100. For example, base station 102A may be coupled to core network 100A, while base station 102B may be coupled to core network 100B. Each core network may be operated by a respective cellular service provider, or the plurality of core networks 100A may be operated by the same cellular service provider. Each core network 100 may also be coupled to one or more external networks (such as external network 108), which may include the Internet, a Public Switched Telephone Network (PSTN), and/or any other network. Thus, the base stations 102 may facilitate communication between the UE devices 106 and/or between the UE devices 106 and the networks 100A, 100B, and 108.

The base stations 102 and the UEs 106 may be configured to communicate over the transmission medium using any of various radio access technologies ("RATs", also referred to as wireless communication technologies or telecommunication standards), such as GSM, UMTS (WCDMA), LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), etc.

Base station 102A and core network 100A may operate according to a first RAT (e.g., LTE) while base station 102B and core network 100B may operate according to a second (e.g., different) RAT (e.g., GSM, CDMA 2000 or other legacy or circuit switched technologies). The two networks may be controlled by the same network operator (e.g., cellular service provider or "carrier"), or by different network operators, as desired. In addition, the two networks may be operated independently of one another (e.g., if they operate according to different RATs), or may be operated in a somewhat coupled or tightly coupled manner.

Note also that while two different networks may be used to support two different RATs, such as illustrated in the exemplary network configuration shown in FIG. 5, other network configurations implementing multiple RATs are also possible. As one example, base stations 102A and 102B might operate according to different RATs but couple to the same core network. As another example, multi-mode base stations capable of simultaneously supporting different RATs (e.g., LTE and GSM, LTE and CDMA2000 1×RTT, and/or any other combination of RATs) might be coupled to a core network that also supports the different cellular communication technologies. In one embodiment, the UE 106 may be configured to use a first RAT that is a packet-switched technology (e.g., LTE) and a second RAT that is a circuit-switched technology (e.g., GSM or 1×RTT).

As discussed above, UE 106 may be capable of communicating using multiple RATs, such as those within 3GPP, 3GPP2, or any desired cellular standards. The UE 106 might also be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of network communication standards are also possible.

Base stations 102A and 102B and other base stations operating according to the same or different RATs or cellular communication standards may thus be provided as a network of cells, which may provide continuous or nearly continuous overlapping service to UE 106 and similar devices over a wide geographic area via one or more radio access technologies (RATs).

Figure 6:
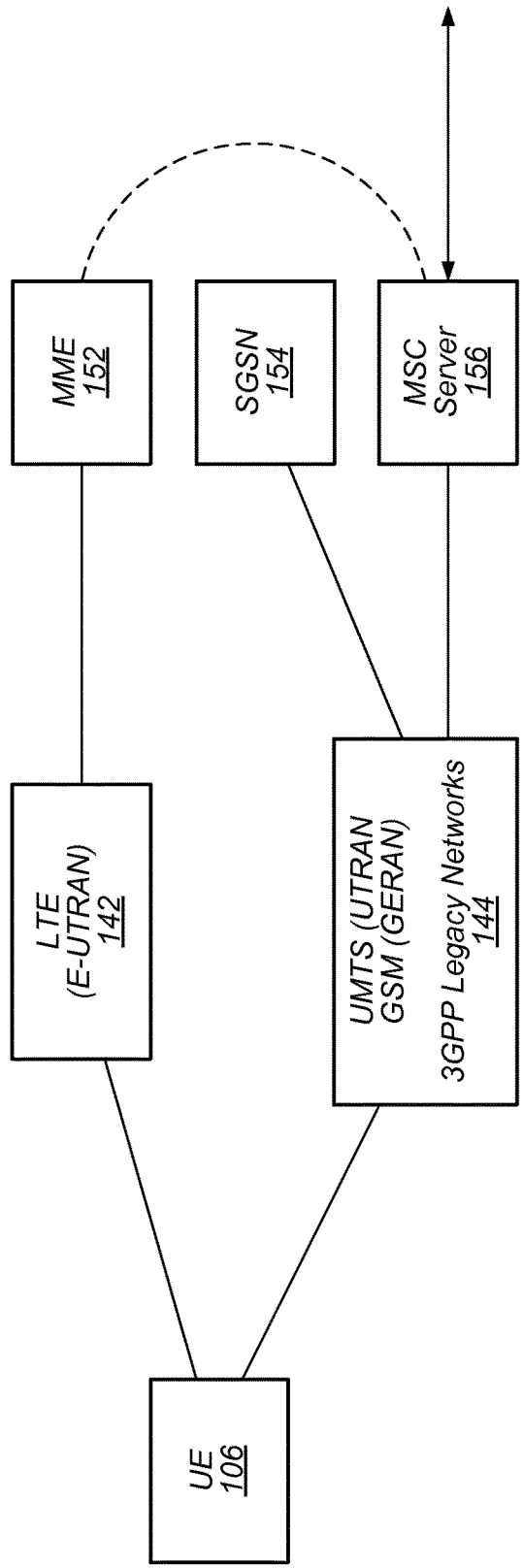
FIG. 6 is a more detailed block diagram of a cellular communication network including both LTE and a 3GPP network.

FIG. 6—Communication Scenario with CSFB

FIG. 6 illustrates an example of a communication scenario that may involve circuit-switched fallback according to the prior art. FIG. 6 describes current prior art CSFB operations and certain problems that occur in prior art CSFB operations. As shown, FIG. 6 shows a simplified view of an example network architecture with parallel LTE and 2G/3G networks. As shown, the LTE network 142 and the legacy 2G/3G network 144 may co-exist in the same geographic area, wherein both networks reside between the mobile customer's User Equipment (UE) and the common core network. The common core network may comprise an MME (Mobility management Entity) 152, an SGSN (Serving GPRS Support Node) 154, and an MSC (Mobile Switching Center) Server 156. GPRS refers to the General Packet Radio Service, which is a packet oriented mobile data service on 2G and 3G GSM (Global System for Mobile communications) networks.

The MME 152 operates to serve UEs while communicating using LTE. The SGSN 154 operates to serve UEs when they are communicating utilizing data services in 2G/3G networks. The MSC Server 156 operates to serve UEs when utilizing voice services in 2G/3G networks. The MSC Server 156 connects to the operator's (carrier's) telephony network. The MME 152 connects to the MSC Server 156 to support CS Fallback (CSFB) signaling and SMS transfer for LTE devices.

The interface (SGs) between the MSC Server 156 and the LTE Mobile Management Entity (MME) 152 enables the UE to be both circuit-switched (CS) and packet-switched (PS) registered while on the LTE access network. This interface also enables the delivery of CS pages as well as SMS communications via the LTE access, without the UE having to leave the LTE network.

A CSFB operation generally operates as follows. Assume that when a UE is currently communicating with the LTE network, i.e., a default LTE data network connection is in operation, a mobile terminating (incoming) CS voice call arrives at the MSC server 156. This incoming CS voice call triggers a page via LTE to the user's UE device. This page initiates a CSFB operation. In performing the CSFB operation, the UE sends an extended service request to the network to transition to 2G/3G. The base station responds with a radio resource control (RRC) release message to release the UE from the LTE network. Once the UE has transitioned from LTE to 2G/3G, legacy call setup procedures are performed to setup the CS call. Mobile originating (outgoing) calls follow the same transition from LTE (PS) to 2G/3G (CS), except that the paging step is not needed. When a CSFB occurs from LTE to a 3G network, PS data sessions can also move to the 3G network for simultaneous voice and data services. When a CSFB occurs from LTE to a 2G network, PS data sessions may be suspended until the voice call ends and the device returns to LTE, unless the 2G network supports dual transfer mode (DTM), which permits simultaneous voice and data. When the voice call ends, the UE device returns to LTE via idle mode or connected mode mobility procedures.

Thus, as described above, when an incoming call arrives or when the UE initiates an outgoing call, the UE device switches from LTE to 2G/3G. Acquisition of the 2G/3G network and setup of the call can employ either of two procedures, these being handover or redirection. In the handover procedure, the target cell is selected by the network and prepared in advance, and the UE can enter this cell directly in connected mode. While still in LTE, Inter-Radio Access Technology (IRAT) measurements of signal strength measurements may be performed prior to making the handover. In the redirection procedure, the target cell is not preselected for the UE, but rather the UE is provided with one or more possible candidate frequencies of a plurality of cells. The UE is then allowed to select any cell on one of the candidate frequencies. The UE may also try other frequencies/RATs if no cell can be found on the provided candidate frequencies. The UE may thus be provided with a frequency list containing possible frequencies of cells that it can select. Once a cell is selected by the UE, the UE initiates normal call setup procedures. Accordingly, CSFB performed using redirection may require less time to identify the best cell as compared to the handover procedure.

Call setup reliability is an important issue for the voice call user experience. Call setup reliability refers to the ability to successfully establish an incoming or outgoing call within a time frame that does not indicate call setup failure, where preferably call setup is established on the first attempt. The desired goal is for the CSFB call setup to at least match legacy performance. Therefore, improvements in this area are desired.

LTE cells can overlap two or more 2G/3G cells. As a result, often times there is uncertainty about which 2G/3G cell is the best target for switchover from an LTE cell. In some instances, the LTE to 2G/3G cell switch may occur in an MSC Server "border" area, where the LTE to 2G/3G switch involves a possible change of MSC Server. However, if the UE were to select a new cell during CSFB that causes it to attach to a different MSC server, this can present problems on certain networks.

An MSC Pool architecture can be deployed to address the setup delays and failure risks in MSC "border" areas, as well as eliminate LAU delay time. The MSC Pool architecture conforms to the 3GPP Release 5 specifications for connection of Radio Access Network (RAN) nodes to multiple Core Network (CN) nodes (MSC servers). With the MSC Pool architecture, all MSC Servers within a pooled area serve all cells in the pool, eliminating MSC "borders" and the time delay of inter-MSC LAUs within the pool. However, MSC Pool architectures are not widely implemented in at least certain networks.

MT Roaming Forwarding (MTRF) can also be used as a complement to the MSC Pool architecture. MTRF is a newer version of the MT Roaming Retry (MTRR) standard. When a fallback is performed across an MSC border, MTRF forwards the call directly from the old MSC Server to the new MSC Server, thereby overcoming the MSC server border issue. MTRF has the advantage over MTRR (MT Roaming Retry) of not needing inter-operator agreements and not rerouting calls back to the GMSC for a second HLR interrogation. This makes MTRF more reliable and easier to deploy. However, again, MTRF is not widely implemented in at least certain networks.

Figure 7:
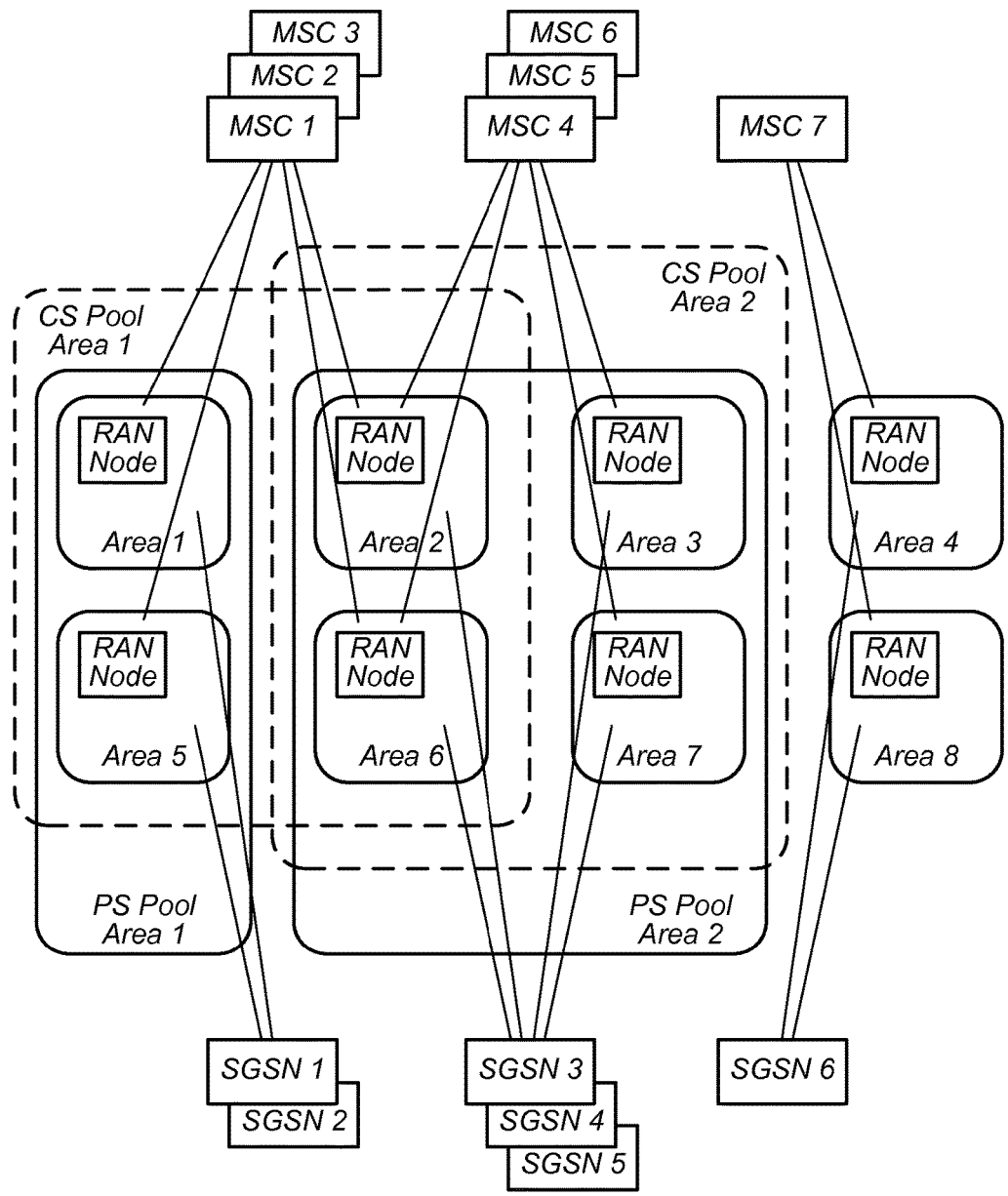
FIG. 7 illustrates a portion of a cellular network comprising overlapping MSC pools.

FIG. 7 shows most of the possible pool-area configurations that can occur in a typical network. A UE is served by one dedicated core network (CN) node (MSC server) of a pool-area as long as it is in radio coverage of the pool-area. As shown, FIG. 7 contains circuit-switched (CS) pool area 1 (RAN area 1, 2, 5, 6 served by MSCs 1, 2, 3), CS pool-area 2 (RAN area 2, 3, 6, 7 served by MSCs 4, 5, 6), PS pool area 1 (RAN area 1, 5 served by SGSNs 1, 2) and PS pool area 2 (RAN area 2, 3, 6, 7 served by SGSNs 3, 4, 5). In addition RAN areas 4 and 8 are served by MSC 7 and SGSN 6 without any usage of Intra Domain Connection of RAN Nodes to Multiple CN Nodes. The possibility to configure overlapping pool-areas is shown by the CS pool-areas 1 and 2. The PS pool areas 1 and 2 are configured as non-overlapping. The pool areas of the CS and the PS domain may be configured identically to the CS pool-area 2 and PS pool area 2, or they may be configured differently as shown by CS pool-area 1 and PS pool area 1. The number or capacity of CN nodes (MSC servers) may be configured independently for each pool area.

A pool (or pool area) may be defined as an area within which a UE may roam without a need to change the serving CN node (the MSC server 156). A pool area may be served by one or more CN nodes (MSC servers) in parallel. The complete service area of a RAN node (RNC or BSC) belongs to the same one or more pool area(s). A RAN node service area may belong to multiple pool areas, which is the case when multiple overlapping pool-areas include this RAN node service area. The pool areas of the CS and of the PS domain may be configured independently with the granularity of RAN node service areas.

A Network Resource Identifier (NRI) identifies uniquely an individual CN node (MSC server) out of all CN nodes which serve a pool area. The length of the NRI may be the same in all nodes of a domain in one pool area. In areas where pool areas overlap, the NRI identifies uniquely a CN node out of all CN nodes which serve all these overlapping pool areas, i.e. an NRI may identify uniquely a CN node within a RAN node. In case of overlapping pool areas the NRI length may be configured to be the same in all the nodes of a specific domain serving these pool areas. The NRIs of the CS and the PS domain may be independent of each other as the PS and the CS domain CN nodes are addressed independently. More than one NRI may be assigned to a CN node.

The NRI is part of the temporary identity TMSI (CS domain) or P-TMSI (PS domain), which is assigned by the serving CN node (MSC server) to the UE. Each CN node which supports the "Intra Domain Connection of RAN Nodes to Multiple CN Nodes" is configured with its specific one or more NRI(s). The (P-)TMSI allocation mechanism in the CN node generates (P-)TMSIs which contain a configured NRI in the relevant bit positions. The NRI has a flexible length between 10 and 0 bits (note that 0 bits means the NRI is not used and the feature is not implemented).

Therefore, as described above, and as shown in FIG. 7, circuit-switched (CS) pool areas may overlap in some geographic areas. When the UE begins a CSFB procedure it will disconnect from the LTE network, whereby the base station sends a Radio Resource Control (RRC) release message to the UE. However, the RRC release in LTE might include cell candidate frequencies from different MSC pools, and thus the UE may inadvertently choose a cell in a different MSC pool, and hence require attachment to a different MSC server. Thus the problem that arises here is that, if the UE is in a CS pool overlap area during a CSFB mobile terminating (MT) (incoming) call procedure, the UE may end up selecting and camping on a different MSC pool than it was on prior to the MT call. This may cause the MT call to fail if MTRF has not been deployed in the network system. Further, the UE sends an Extended Service Request message to the network to initiate a CSFB or CSFB call, or respond to an MT CS fallback request from the network. Typically, when an ESR failure occurs, the UE may select a GSM or UTMS (GERAN/UTRAN) cell in a different radio access network (RAN), which could increase the failure rate. For example, assume the UE initiates an ESR for a CSFB mobile terminating (MT) call in RAN (radio access network) Service Area 2, where MSC1 is the serving MSC. After the ESR has failed in the current cell selection, the UE may camp in the cell belonging to RAN Service Area 3. In this instance, then MSC4 will be the serving MSC. In a network wherein MTRF capabilities have not been deployed, then the CSFB MT call will fail. This will negatively impact the user experience. One example of a network where MTRF capabilities have not been deployed is the China Mobile (CMCC) network, i.e., CMCC has only deployed a few MTRF capabilities in its current network.

Figure 8:
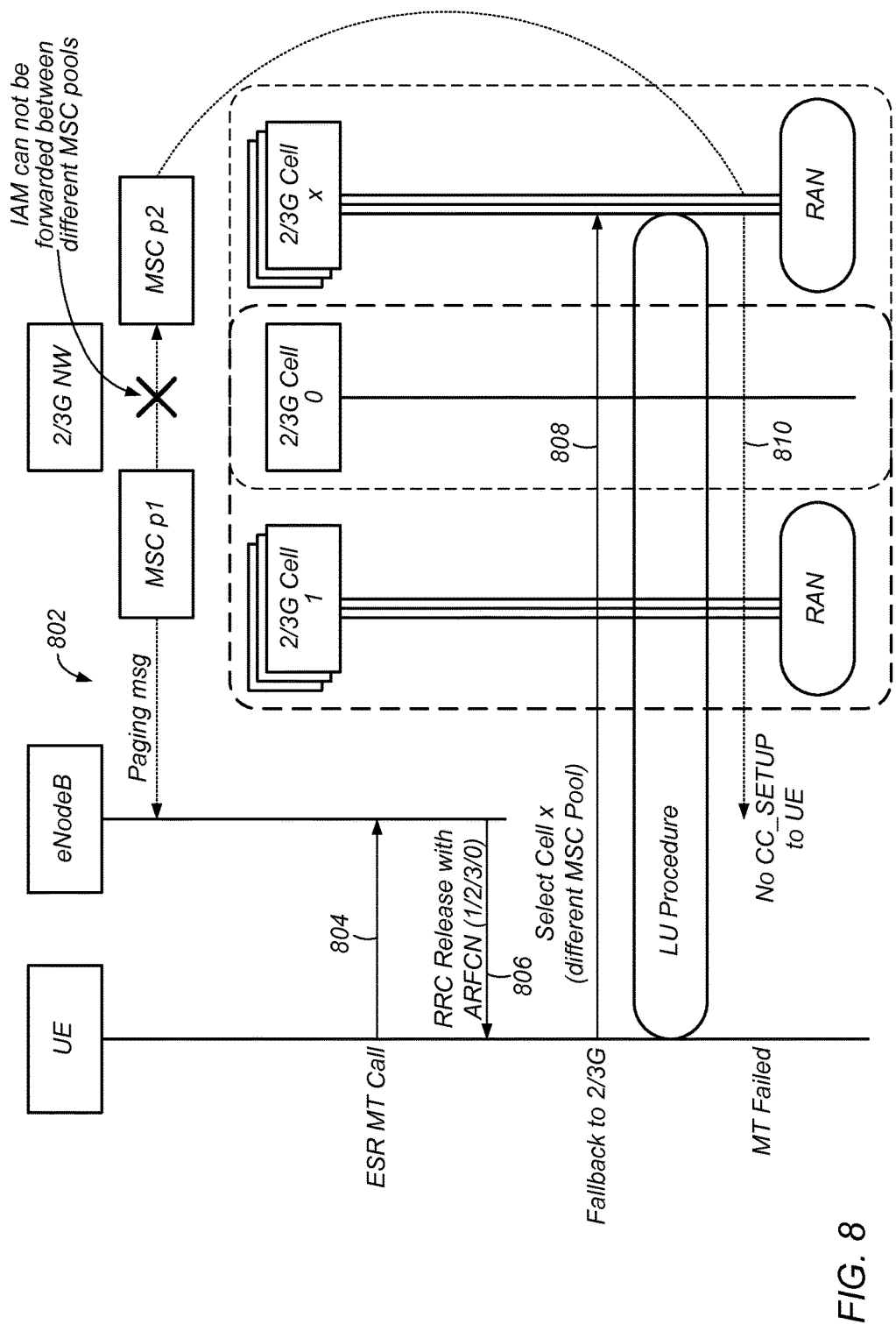
FIGS. 8 and 9 illustrate examples of a circuit-switched fallback to a different pool which results in call failure, according to some embodiments.
Figure 9:
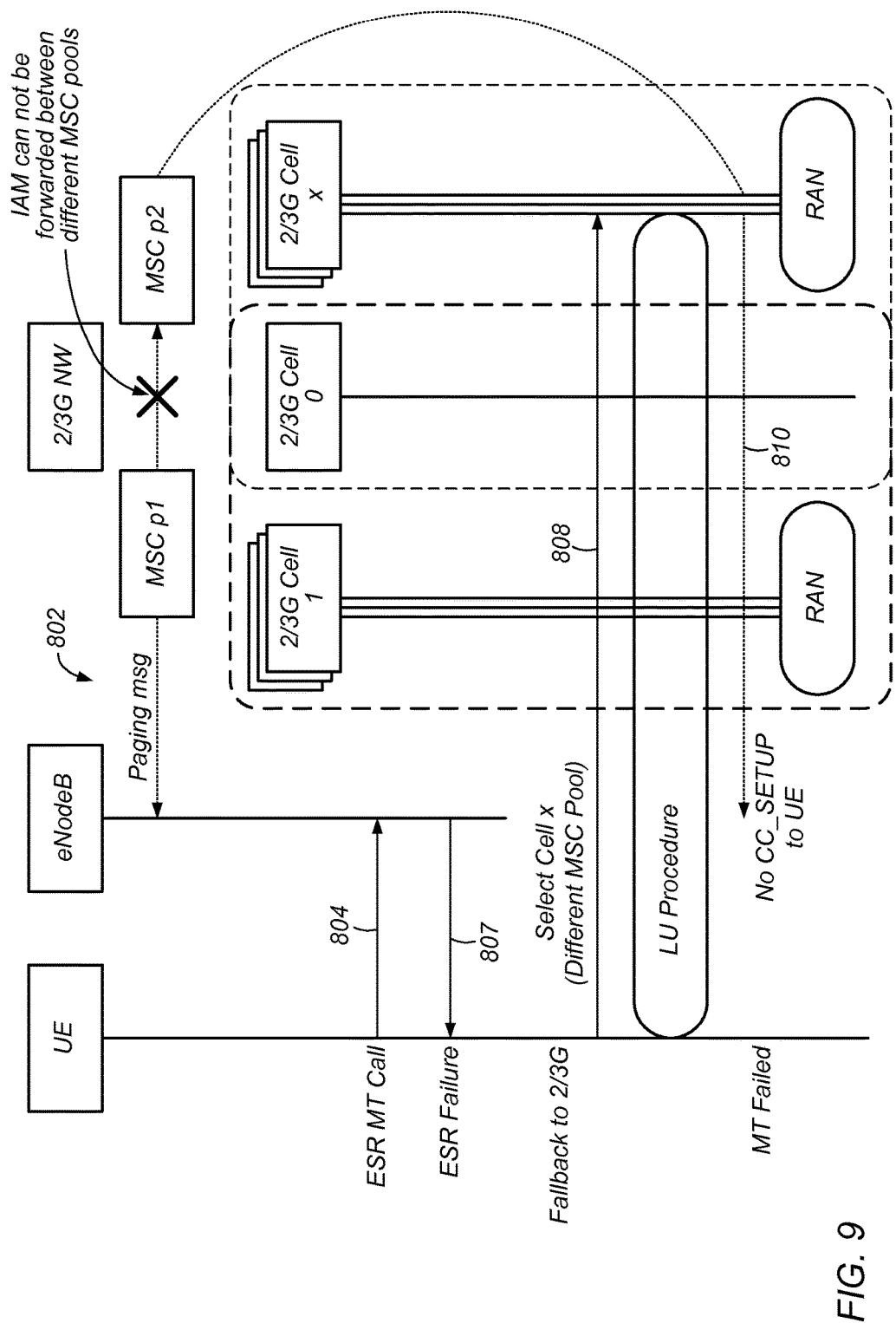

FIGS. 8 and 9—CSFB to a Different Pool Resulting in Call Failure

FIG. 8 illustrates one example of a CSFB fallback procedure which results in MT call failure, according to some embodiments. As shown, when a MT (incoming) call arrives via paging message 802 to the base station, and a page is provided to the UE (not shown), the UE issues an extended service request (ESR) 804 to the base station in response to the MT call. The base station (eNodeB) then responds with an RRC release 806 to release the UE from the LTE network. The RRC release message 806 from the base station may include one or more absolute radio-frequency channel numbers (ARFCNs). The RRC release message may include absolute radio-frequency channel numbers (ARFCNs) that belong to two or more different MSC pools. Note that in GSM cellular networks, an absolute radio-frequency channel number (ARFCN) is a code that specifies a pair of physical radio carriers used for transmission and reception in the mobile wireless system, one for the uplink signal and one for the downlink signal. Thus, uplink/downlink channel pairs in GSM are identified by ARFCN.

In response to the RRC release message received from the base station, the UE performs a fallback 808 to a 2G/3G network. During the CS fallback, the UE could select a 2G/3G cell from a different MSC pool than the pool on which it was camped when the MT call arrived. Note that in this example the UE chooses to camp on a cell from a different MSC pool (MSC pool 2). This choice by the UE to camp on a different MSC pool may cause the MT call to fail. As shown in FIG. 8, failure may result due to the fact that an IAM message cannot be forwarded between the MSC servers operating these different pools, i.e., the IAM message cannot be forwarded between the prior MSC pool (pool 1) and the newly selected MSC pool (pool 2). As a result, no CC_setup 810 is provided to the UE, resulting in call failure.

FIG. 9 illustrates another example of a CSFB fallback procedure which results in MT call failure, in this case involving an ESR failure scenario. As shown, as with FIG. 8, when a MT (incoming) call page 802 arrives and is provided to the UE, the UE issues an extended service request (ESR) 804 to the base station in response to the MT call. However, in this example, the ESR message sent by the UE ends in an ESR failure 807. When ESR failure 807 occurs, the UE may perform normal cell selection to GERAN (GSM), which will likely be in a different MSC pool. This may result in call failure, e.g., no CC_setup 810. Note that an ESR failure has a higher possibility of causing the UE to select a different MSC pool, as compared to an RRC release. For example, note that the network (NW) may take some action to avoid sending an ESR failure, which may include assigning a cell to the UE that belongs to different MSC pool. Such an assignment of a cell belonging to a different MSC pool would result in the UE camping on this different MSC pool, causing MT call failure.

Thus for each of the examples of FIGS. 8 and 9, MT call failure occurs, resulting in performance degradation. This performance degradation occurs in the event of either an RRC release or an ESR failure.

Figure 10:
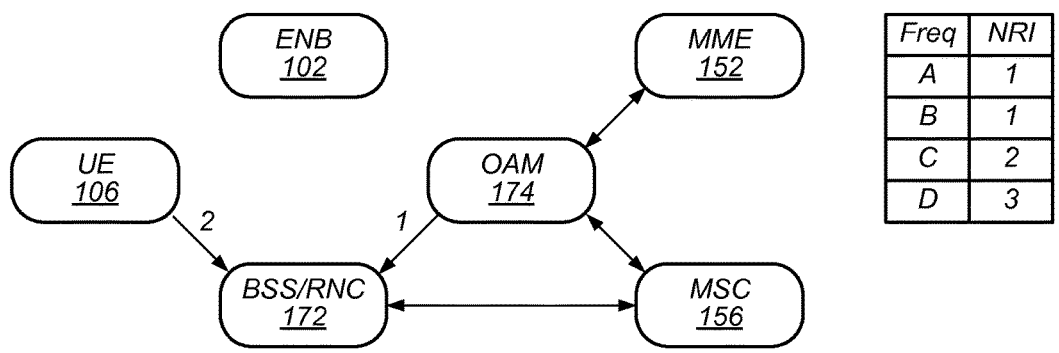
FIG. 10 is a flow diagram illustrating improved CSFB operations according to a first embodiment, where pool id information is provided from the BSS/RNC to the UE.
Figure 11:
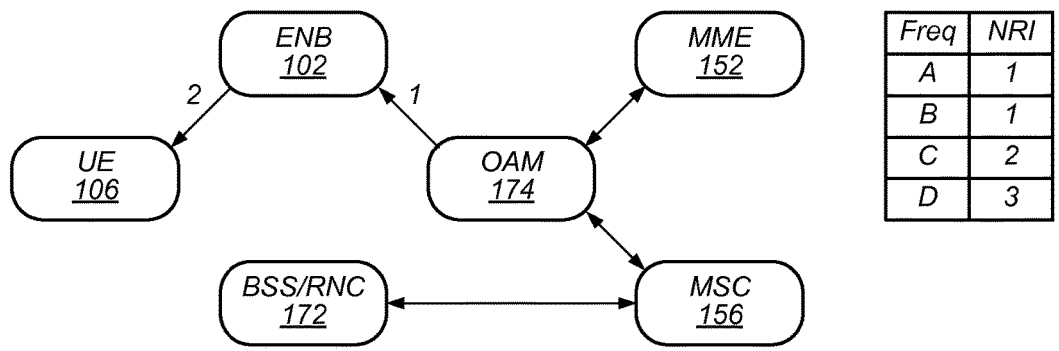
FIG. 11 is a flow diagram illustrating improved CSFB operations according to a second embodiment, where pool id information is provided from the base station to the UE.

FIGS. 10 and 11: Flow Diagram Embodiments

FIGS. 10 and 11 are simple flow diagrams that show embodiments of a method for providing improved reliability of CSFB call operations. Here the UE is provided with information regarding the MSC servers to which various of its neighboring or candidate cells are currently attached, so that it can select a cell that corresponds to the same MSC server. This operates to help prevent a call failure from lack of MTRF deployment.

In the embodiments described herein, the UE receives information on the current MSC server that is currently serving the UE. For example, the UE may know its own MSC server, e.g., may know its own pool id from its TMSI (Temporary Mobile Station Identifier). The UE may also receive information regarding the MSC servers of neighboring candidate cells. One way to provide this current MSC server information is to provide to the UE the pool area id's (or pool id's) of these various candidate cells, in particular the pool id's of the pools in which these various other cells are currently operating. Since cells in the same pool use the same MSC server, this pool id information enables the UE to select a cell that corresponds to the same MSC server, by selecting a cell in the same pool. Thus the pool id serves as a proxy for identifying the current MSC server for each of these candidate cells. It is noted that other information identifying the current MSC server (the MSC server to which the these various candidate cells are currently attached) may be provided to the UE instead of, or in addition to, the pool id's of these cells, such as the MSC server address, or any of various other types of MSC server identifying information. For example, in some implementations where cells in the same pool do not necessarily use the same MSC server, other information may be used to identify the MSC servers for these candidate cells, such as MSC server address.

Referring now to FIG. 10, the network system includes a base station subsystem/radio network controller (BSS/RNC) 172 that is in wireless communication with the UE 106. The BSS/RNC 172 is coupled to the MSC server 156. The BSS/RNC 172 is also coupled to an OAM server 174, which in turn is coupled to the MSC server 156 and the MME 152. At "1" in FIG. 11, the BSS/RNC may obtain the current UE MSC pool frequency and NRI pool id's of these candidate cells from the OAM server, which in turn may have obtained this information from the MSC server. This step will typically occur prior to the MT call request, but may also occur during the CSFB operation. Thus, as further described in FIG. 13, the BSS/RNC may also obtain cell frequency/pool id information for the plurality of other cells and may broadcast this information to the UE. This cell frequency/pool id information for a plurality of other cells may be obtained by the BSS/RNC from respective MSC servers gathered by the OAM server.

More specifically, when the UE originally connects to the network, it attaches to an MSC server via a 2G/3G network. The MSC server then allocates a valid TMSI (Temporary Mobile Station ID) to the UE. The TMSI contains 32 bits, wherein a portion of the TMSI has an NRI field. The NRI field may be contained in the middle 0-10 bits of the TMSI. One or more bits of the NRI field contain the pool id of the pool (or pool area) on which the UE is currently camped.

The BSS/RNC may obtain the NRI from the MSC server for each of a plurality of possible candidate cells, either directly or via the OAM server. As noted above, the NRI field contains the pool id of the pool on which a cell is currently operating, thus allowing the BSS/RNC to know this pool id. For 3GPP Iu mode, the BSS/RNC can obtain the NRI via IDNNS in RRC. The BSS/RNC may also (or instead) obtain other information useable to identify the current MSC server of these neighboring cells, such as MSC addressing information.

Prior to or during a CSFB fallback operation, the BSS/RNC broadcasts the frequency list of potential fallback cells and their corresponding pool id's to the UE via SI/SIB (System Information/System Information Blocks).

At "2" of FIG. 10, the UE then performs cell selection based on this information to select the cell mapping to the same pool as the original cell, or to the same MSC server. More specifically, when the UE receives a mobile terminating (MT) (incoming) call and performs a CSFB operation, the UE performs cell selection to select a new CS cell on which to camp. The UE knows the current pool id it is camped on, having obtained it from its own TMSI or received it from the BSS/RNC or base station. The UE may also know the cell frequency/pool id information for a plurality of the candidate cells, having received this from the BSS/RNC as described above, or perhaps from an OTA server. Alternatively, the UE receives broadcasts from various ones of the different neighboring cells, and for each respective cell this broadcast information includes the frequency of the cell and the pool id (or other pool or MSC identifying information) for the respective cell.

When the UE receives this cell frequency/pool id information regarding the various possible cells, the UE may store the new cell's frequency and the corresponding pool id of the respective cell in a memory, such as a data structure. The UE then compares the pool ids of these potential cells (at least a plural subset of these candidate cells) with the pool id of the cell on which it is currently camped. Thus the UE uses this information to select a cell belonging to the same pool on which it was camped prior to the CSFB operation.

Thus the UE selects a cell in the same pool as it was in before the MT call request came in, and thus continues to use the same MSC server as before. In other words, selecting a cell in the same pool entails that the MSC server does not change. In other embodiments, the UE selects a cell that is known to be associated with the same MSC server to which it is currently attached, based on other information, such as MSC server address or other id, or other types of information capable of identifying the MSC server.

FIG. 11 is a simple flow diagram of a second embodiment, which is similar to that described above with reference to FIG. 10. Thus only the primary differences from FIG. 10 are noted in detail. In this embodiment, the base station (eNodeB) stores the same pool id information (or possibly other information such as MSC addressing information) as the BSS/RNC stored as describe above. In this embodiment, the network operator is presumed to have deployed an OAM system between the base station and BSS/RNC. The OAM system is then configured by the network operator as a type of relay node, where the BSS/RNC transfers cell frequency/pool id information to the OAM and the OAM transfers this information to the base station (eNodeB). The base station then forwards this cell frequency/pool id information to the UE, such as in the RRC Release message during CSFB. Thus during CSFB the UE will have the necessary information to know the current MSC pool, as well as the pool id's of a number of other cells, and can select a cell which belongs to the same pool.

As shown in FIG. 11, at "1" the base station (eNodeB) obtains the pool id information for various candidate cells from the OAM server. As noted above, the OAM server will have previously received this from either the MSC server, or possibly from the BSS/RNC. At "2" the base station transmits an RRC release message to the UE during a CSFB call operation. The base station transmits the pool id information (and/or MSC addressing information) of these neighboring cells to the UE as part of the RRC release message. The RRC release message may thus include a list of frequencies/pool id's of corresponding candidate cells. As described above, the UE may also or instead receive the cell frequency and pool id information of each of these candidate cells from an OTA server, or from the cells themselves. The UE then selects the appropriate CS cell belonging to the same pool based on the received pool id information of the various candidate cells received from the base station. Stated another way, the UE then performs cell selection, whereby the UE uses the received pool id information of the candidate cells to determine the appropriate CS cell to select belonging to the same pool area in which it is currently operating.

Figure 12:
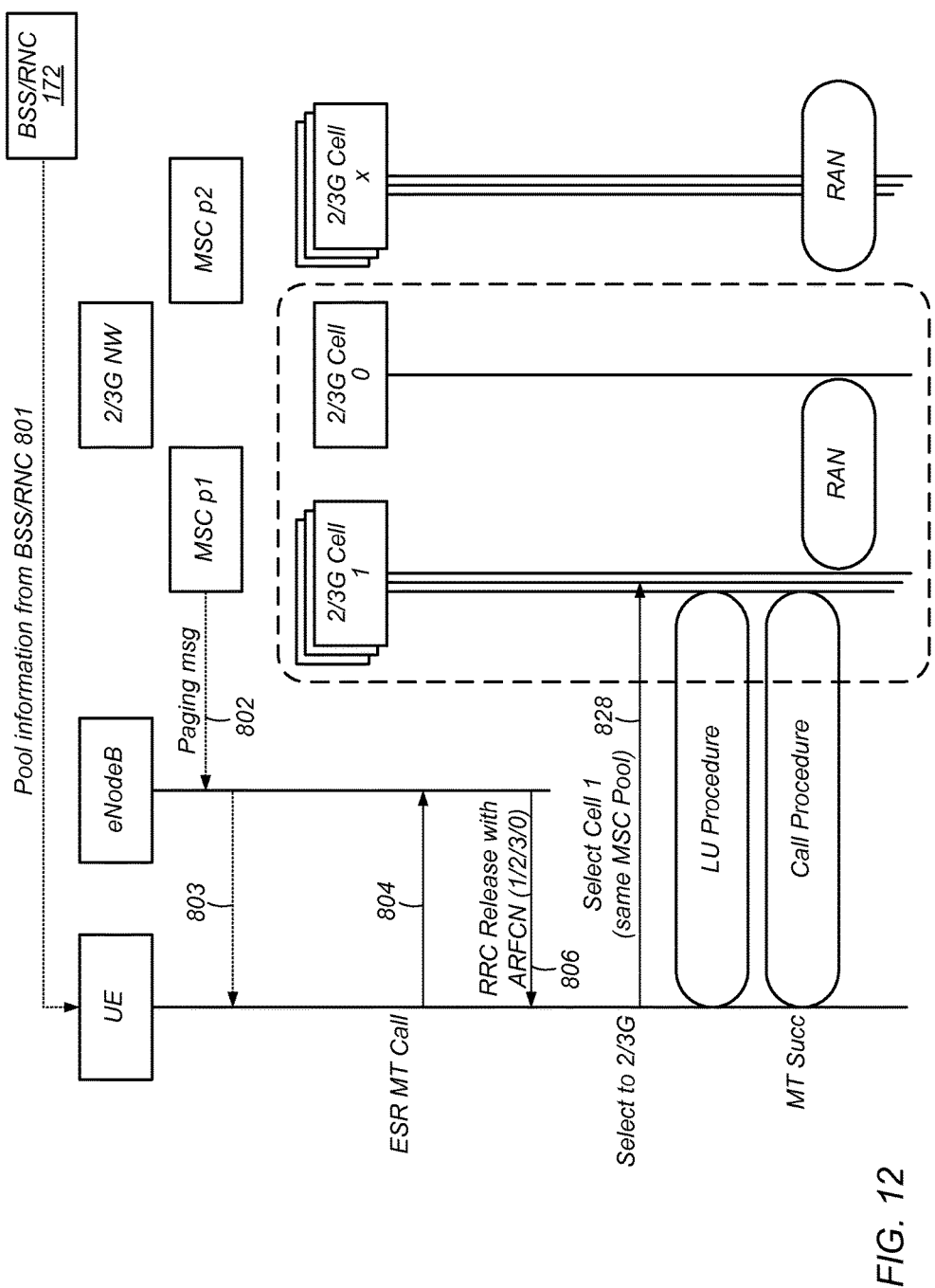
FIG. 12 is a more detailed flow diagram illustrating improved CSFB operations according to the flow diagram of FIG. 10.

FIG. 12—Detailed Flow Diagram

FIG. 12 is a more detailed flow diagram of the method shown in FIG. 10. The method of FIG. 12 corresponds to the flow shown in FIG. 10. In the embodiment described in FIG. 10, prior to or during the CSFB operation, the BSS/RNC 172 may transmit to the UE at 801 the pool information regarding the pools in which various candidate cells are operating (shown in FIG. 14). It is noted that the BSS/RNC may instead, or in addition, send other information capable of identifying the current MSC servers of these candidate cells, such as the current MSC server address.

The BSS/RNC devices may thus broadcast cell frequency/pool id information of these various candidate cells to the UE at 801, where this information may have been gathered by an OAM server from different MSC servers. This operation is described with respect to FIG. 14. When the UE receives this broadcast information from the BSS/RNC device regarding the various possible cells, for each respective cell the UE stores the respective cell's frequency and corresponding pool id of the respective cell. For example, the UE may store this information in a data structure such as a table, to allow for easy searching during cell reselection (during CSFB). The BSS/RNC, or the UE, may instead (or in addition) receive this cell frequency/pool id information of other cells from an OTA server.

As shown in FIG. 12, presume the network receives a mobile terminating (MT) call request to establish a CSFB call with the UE while the UE is camped on, or operating on, a packet-switched (PS) network. It is noted that embodiments of the invention may operate with a call originating from the UE as well as calls to the UE (MT calls). This MT call request may be received in the form of a paging message 802 received by the base station (eNodeB), that is then provided to the UE at 803. One example of such a PS network is LTE. Prior to the MT call (or when the MT call is received), the UE is camped on MSC pool 1, as shown. In response to the MT call received on the network, MSC p1 issues paging message 802 to the base station, which then pages the UE at 803. As shown, in response to the paging message, the UE transmits an Extended Service Request (ESR) at 804 to the base station (eNodeB) as shown.

The base station (eNodeB) then responds with an RRC release 806 to release the UE from the LTE network. The RRC release message from the base station may comprise the frequency list of cells on which the UE can camp, i.e., may include one or more absolute radio-frequency channel numbers (ARFCNs), including absolute radio-frequency channel numbers (ARFCNs) of cells that belong to two or more different MSC pools.

During cell selection at 82 the UE then compares the pool id of the cell on which it is currently camped with the pool id's of these potential cells, e.g., at least a subset, preferably a plural subset, of these potential cells. For example, the UE might use the pool id of its current cell to search for other candidate cell frequencies that have this same pool id, and to select one of these cells that has the same pool id. It is noted that the UE may of course in addition use other criteria in performing its cell selection, such as received signal strength, etc. Thus selection of the candidate cell being performed based on the pool information comprises performing the selection based at least in part on the pool information, i.e., this selection may also be based on other factors as well. The UE then selects a cell, e.g., cell 1, at 828, which is in the same MSC pool as the pool in which the UE was previously operating, i.e., with the same pool id of the cell on which it was already camped. This results in a successful call.

Therefore, in summary the BSS/RNC broadcasts the pool area id's of the current pool area, (or possibly other information such as the MSC address), of the various possible candidate cells to the UE. Thus the UE has previously received the pool information of these neighboring cells from the BSS/RNC, and when a CSFB operation is being performed by a UE, and the respective UE is in a pool overlap area, the UE uses this information to select a cell that is located in the same pool area in which it is currently operating, i.e., that it was in before. A cell that is in the same pool as before will also share the same MSC server. This operates to prevent the UE from inadvertently selecting a cell in a different pool area and hence using a different MSC server, thus providing improved reliability of CSFB operations. In other words, this helps to avoid call failures that would result if the UE selected a cell in a different pool area and hence different MSC server.

Figure 13:
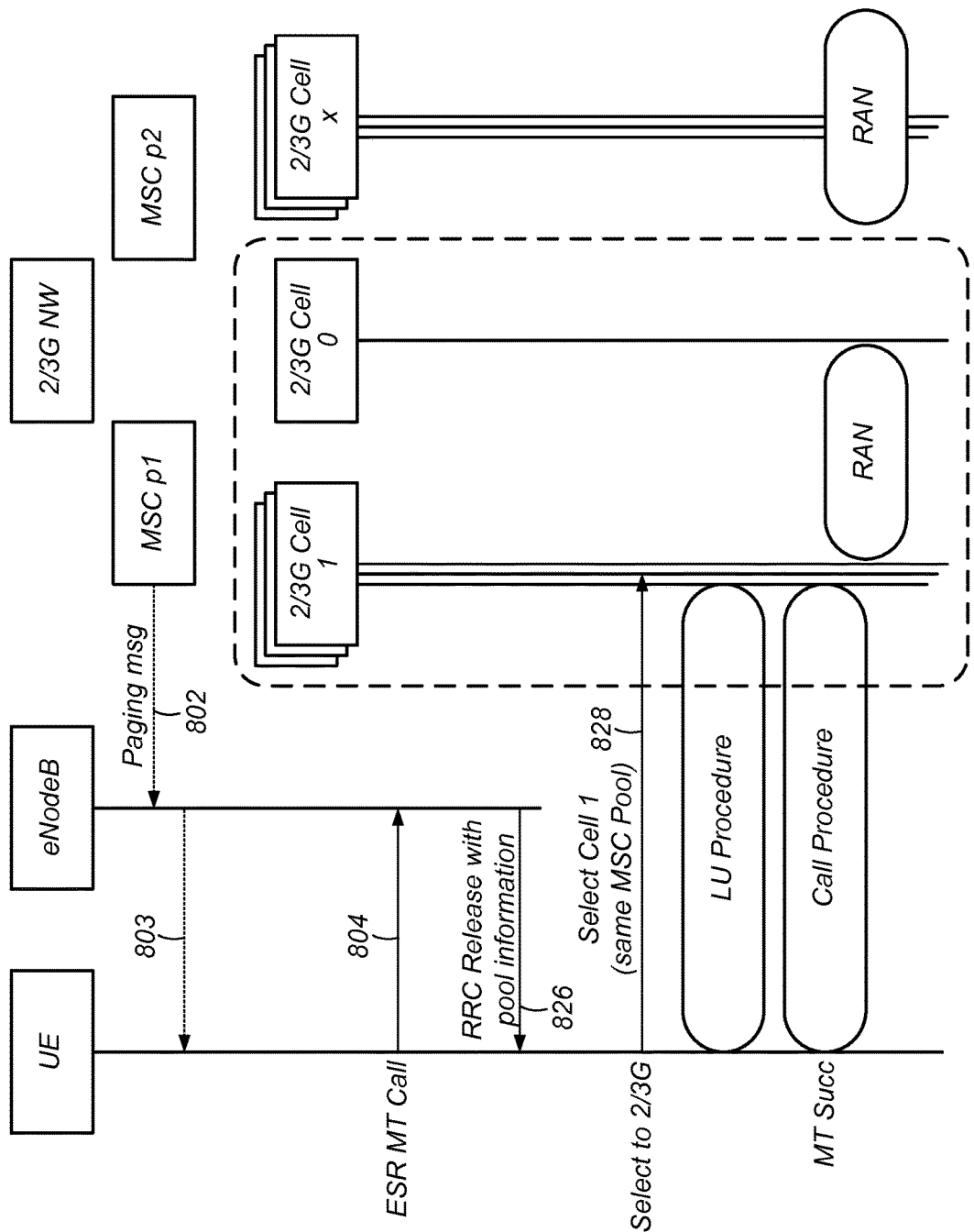
FIG. 13 is a more detailed flow diagram illustrating improved CSFB operations according to the flow diagram of FIG. 11.

FIG. 13: Second Embodiment

Referring now to FIG. 13, the method will now be described with respect to the flow shown in FIG. 11. As shown in FIG. 13, presume the network receives a mobile terminating (MT) call request to establish a CSFB call with the UE while the UE is camped on, or operating on, a packet-switched (PS) network. One example of such a PS network is LTE. Prior to the MT call, the UE is camped on MSC pool 1, as shown. In response to the MT call received on the network, MSC p1 issues a paging message 802 to the base station, which then pages the UE at 803. As shown, in response to the paging message, the UE transmits an Extended Service Request (ESR) 804 to the base station (eNodeB) as shown.

The base station (eNodeB) then responds with an RRC release at 826 to release the UE from the LTE network. The RRC release message 826 from the base station may comprise the frequency list containing cell frequencies on which the UE can camp, as well as corresponding pool id information for these cell frequencies. In other words, this information may include one or more absolute radio-frequency channel numbers (ARFCNs), including absolute radio-frequency channel numbers (ARFCNs) that belong to two or more different MSC pools, and the corresponding pool id information for each of these cell frequencies. The RRC release message sent by the base station at 826 may also comprise other information identifying the MSC server or pool associated with these various candidate cells, such as the MSC server address.

Therefore, when a CSFB operation is being performed by a UE, and the respective UE is in a pool overlap area, in this embodiment the base station (eNodeB 102) broadcasts the cell frequencies and corresponding pool id's of the neighboring or candidate cells to the UE in an RRC message at 826. The UE receives the cell frequency/pool id information from various candidate cells in the RRC message, and uses this information to select a cell at 828 that is located in the same pool area that it was in before. For example, the UE may store the cell frequency/pool id information of various cells in a data structure and use a search as described above. This helps to avoid call failures that would result if the UE selected a cell in a different pool area, and hence served by a different MSC server. Stated another way, when the UE then performs cell selection, the UE uses its own pool id, and the pool id's of other candidate cells, to select the CS cell belonging to the same pool area in which it is currently operating. This operates to prevent the UE from inadvertently selecting a cell in a different pool area, thus preventing possible call failure and providing improved reliability of CSFB operations.

Figure 14:
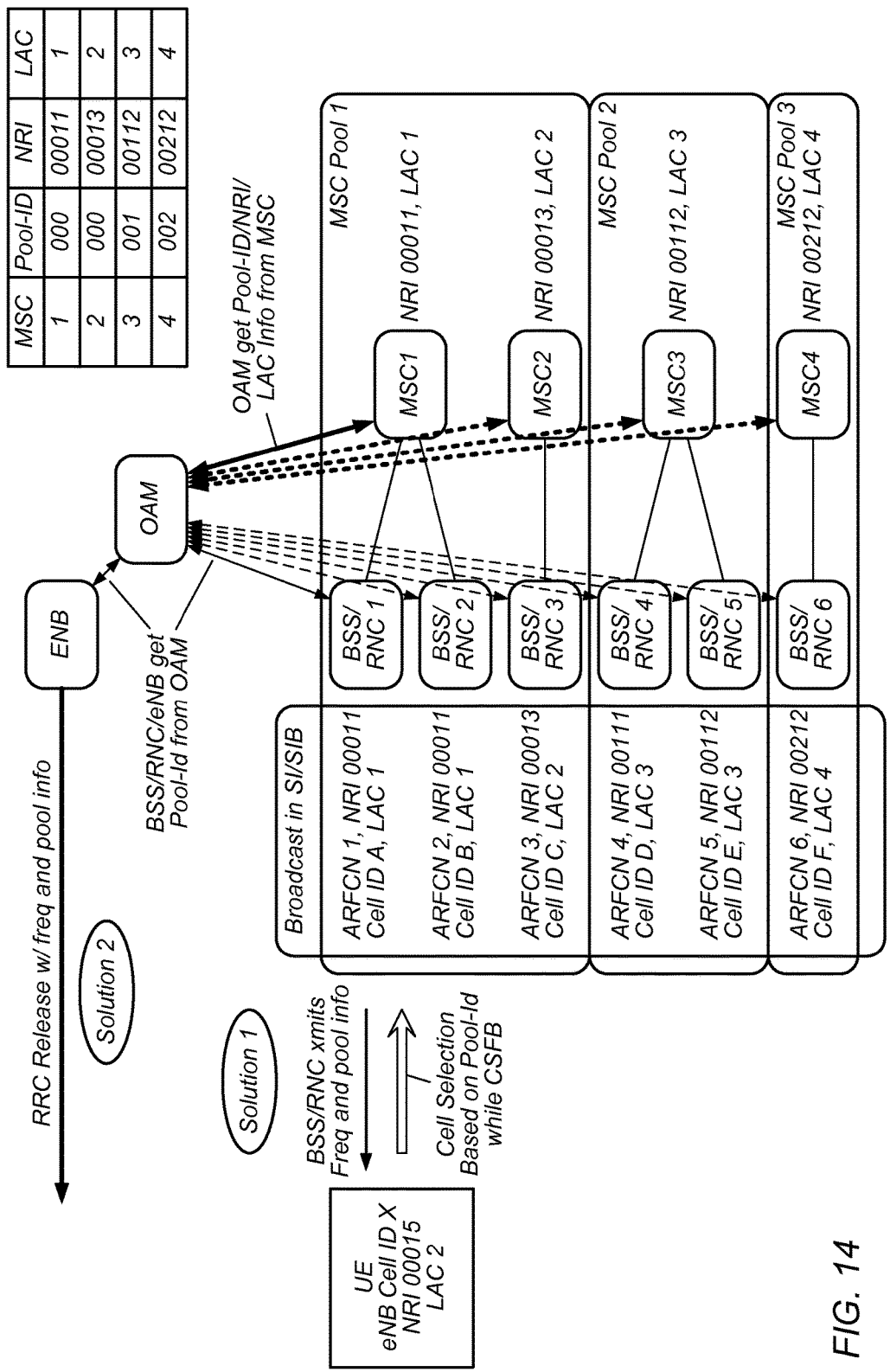
FIG. 14 illustrates the manners in which pool id information is provided from MSC servers to a UE, according to some embodiments.

FIG. 14—Providing Information to the UE

FIG. 14 illustrates the two different methods for providing MSC server information of candidate cells to the UE, as described above in FIGS. 12 and 13. As noted above, in the embodiments described herein the MSC server information that is provided comprise pool information, e.g., the current pool id's of each respective cell. The pool id's for each cell are thus transmitted to the UE, wherein the pool id's are used in cell selection as described herein.

In a first embodiment the pool id's of other candidate cells are transmitted in a BSS/RNC broadcast message to the UE. As shown, the OAM server gathers MSC server information (pool id information) and location area code (LAC) from each of a plurality of MSC servers for a number of candidate cells. The pool id information is in the form of NRI bits. Thus for example the information gathered from the OAM server may be in the form of:

MSC pool 1: NRI 00011, LAC 1 and NRI 00013, LAC 2;
MSC pool 2: NRI 00112, LAC 3;
MSC pool 3: NRI 00212, LAC 4;

The OAM server then provides the corresponding pool id information and LAC number for a number of cells to the BSS/RNC server of a respective one or more UEs, and in fact may provide this information to multiple BSS/RNC servers as shown. The BSS/RNC server then may add additional information such as frequency and cell ID to each set of information. As a result, the BSS/RNC may generate information such as:

BSS/RNC 1: ARFCN 1, NRI 00011, Cell ID A, LAC1
BSS/RNC 2: ARFCN 2, NRI 00011, Cell ID B, LAC1
BSS/RNC 3: ARFCN 3, NRI 00013, Cell ID C, LAC2
BSS/RNC 4: ARFCN 4, NRI 00111, Cell ID D, LAC3
BSS/RNC 5: ARFCN 5, NRI 00112, Cell ID E, LAC3
BSS/RNC 6: ARFCN 6, NRI 00212, Cell ID F, LAC4

The BSS/RNC broadcasts this set of cell frequency/pool id information/cell ID/LAC to the UE as shown. As shown, the OAM server provides the set of information, including the various cell frequencies and corresponding pool id information, to a plurality of different BSS/RNC servers so that the method can be implemented in a plurality of different cell regions, i.e., for UEs served by different BSS/RNC devices.

In the second embodiment the pool id's of other candidate cells are transmitted in a RRC release message from the base station (eNB) to the UE. As shown, the OAM server gathers MSC server information (pool id information) and location area code (LAC) from each of a plurality of MSC servers for a number of candidate cells as described above, and provides this to the base station (eNB). The base station then transmits this information, along with cell frequency information, onward to the UEs, such as during an RRC release message during CSFB. Note that here the base station may not have the cell ID or LAC number information as did the BSS/RNC, and thus this information is not included. Thus the base station may transmit to the UE something like:

ARFCN 1, NRI 00011,
ARFCN 2, NRI 00011,
ARFCN 3, NRI 00013,

ARFCN 4, NRI 00111,
ARFCN 5, NRI 00112,
ARFCN 6, NRI 00212,

As noted above, the UE may utilize this information received from the base station to select a cell during CSFB that is in the same pool (has the same pool id) as the pool on which it is currently camped.

The following paragraphs describe additional embodiments.

A. A non-transitory computer accessible memory medium comprising program instructions for a wireless user equipment (UE) device to establish a circuit-switched fallback (CSFB) call, wherein the program instructions are executable to:
receive a request to establish a CSFB call, wherein the UE is operating in a current pool having a first pool id;
receive a pool id for each of a plurality of candidate cells, wherein the pool id for each respective candidate cell identifies a pool in which the respective cell is operating;
select a circuit-switched cell on which to camp based at least in part on the first pool id and the pool id's of at least a plural subset each of the plurality of candidate cells, wherein the selected circuit-switched cell is in the current pool.

B. A method for a wireless user equipment (UE) device to establish a circuit-switched fallback (CSFB) call, the method comprising:
establishing a first wireless link with a first cell, wherein the first cell provides a connection to a network, wherein the first cell provides packet-switched services, wherein the first cell does not provide circuit-switched services, wherein the first cell is in a first pool;
receiving a request to establish a call;
receiving, via the first wireless link, instructions to establish the call as a CSFB call, wherein the instructions indicate to the UE to release the first wireless link with the first cell and establish a second wireless link with a second cell;
receiving pool information from the base station, wherein the pool information identifies pools corresponding to a plurality of candidate cells neighboring the UE; and
selecting a circuit-switched cell on which to camp based on the received pool information, wherein the selected circuit-switched cell is in the first pool.

C. A method for a wireless user equipment (UE) device to perform a circuit switched fallback (CSFB) call, the method comprising:
performing by the UE,
receiving a request to establish a CSFB call, wherein the UE is operating in a current pool;
receiving first pool information from the base station relating to a plurality of candidate cells, wherein the pool information identifies a respective pool for each of the plurality of candidate cells;
selecting a circuit-switched cell on which to camp based on the first pool information, wherein the selected circuit-switched cell is in the current pool.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for a wireless user equipment (UE) device to perform a circuit-switched fallback (CSFB) call, the method comprising:
performing by the UE,
receiving a request to perform a CSFB operation to handle a call, wherein the UE is operating in a current pool when the request is received;
receiving pool information identifying a plurality of pools within which each of a plurality of candidate cells are operating;
selecting a circuit-switched cell on which to camp, wherein the circuit-switched cell is selected based on the pool information such that the circuit-switched cell is operating in the current pool; and
performing the CSFB operation to handle the call with the selected circuit-switched cell.

2. The method of claim 1, wherein the pool information comprises a pool id for each of the candidate cells.

3. The method of claim 1,
wherein said receiving the pool information occurs prior to said receiving the request to perform the CSFB operation.

4. The method of claim 1,
wherein the UE is operating in a pool overlap area during said receiving the request to perform the CSFB operation and said performing the CSFB operation.

5. The method of claim 1,
wherein said receiving the pool information occurs during said performing the CSFB operation.

6. The method of claim 1,
wherein the pool information comprises, for each respective candidate cell of the plurality of candidate cells, a frequency of the respective candidate cell and a pool id of a pool in which the respective candidate cell is operating;
wherein said selecting the circuit-switched cell on which to camp comprises selecting the circuit-switched cell based on comparing a pool id of the current pool in which the UE is operating with the pool id's of at least a subset of each of the plurality of candidate cells.

7. The method of claim 1,
wherein for each of the plurality of candidate cells the pool information comprises a cell frequency, a pool id, a cell id, and a location area code.

8. The method of claim 1,
wherein the current pool in which the UE is operating has a first pool id;
wherein said selecting the circuit-switched cell on which to camp comprises selecting a first cell frequency of the selected circuit-switched cell from a plurality of candidate cell frequencies;
the method further comprising storing, by the UE, the pool information for each of the plurality of candidate cells in a data structure, wherein, for each candidate cell, the data structure stores a candidate cell frequency and a corresponding pool id of a pool to which the cell frequency belongs;
wherein said selecting the circuit-switched cell on which to camp comprises comparing the first pool id with pool id's in the data structure to select the first cell frequency.

9. The method of claim 5,
wherein said receiving the pool information comprises receiving the pool information in a Radio Resource control (RRC) release message from a base station during the CSFB operation.

10. A wireless user equipment device (UE), the UE comprising:
a radio, comprising one or more antennas for performing wireless communications;
a processor;
a memory medium comprising program instructions executable by the processor, wherein the program instructions are executable to:
receive a request to perform a circuit-switched fallback (CSFB) operation to handle a call, wherein the UE is operating in a current pool when the request is received;
receive first information, wherein the first information identifies a plurality of pools within which each of a plurality of candidate cells are operating;
select a circuit-switched cell on which to camp, wherein the circuit-switched cell is selected based on the first information such that the circuit-switched cell is operating in the current pool;
perform the CSFB operation to handle the call with the selected circuit-switched cell.

11. The UE of claim 10, wherein the first information comprises a plurality of MSC addresses, wherein each of the MSC addresses identifies a respective MSC server for at least one of the plurality of cells;
wherein the circuit-switched cell is selected such that the circuit-switched cell is served by the current MSC server which is currently serving the UE.

12. The UE of claim 10, wherein the first information comprises pool information for each of the plurality of cells;
wherein the circuit-switched cell is selected based on the received pool information such that the selected circuit-switched cell is in the same pool as a pool in which the UE is currently operating.

13. The UE of claim 10,
wherein the UE has a current pool id;
wherein the first information comprises a list of cell frequencies and a corresponding pool id for each of the cell frequencies;
wherein said selecting the circuit-switched cell on which to camp comprises selecting a cell frequency of the circuit-switched cell based on the current pool id of a current pool in which the UE is operating and the pool id's of each of at least a subset of the plurality of cells.

14. The UE of claim 10,
wherein the first information is received from a radio network controller.

15. The UE of claim 10,
wherein the first information is received in a Radio Resource control (RRC) release message from a base station during the CSFB operation.

16. The UE of claim 10,
wherein the UE is operating in a network that does not support MT Roaming Forwarding (MTRF).

17. The UE of claim 13,
wherein the memory medium is further configured to store a data structure comprising the first information, wherein the data structure stores a cell frequency and pool id for each of the plurality of cells;
wherein the program instructions are further executable to select the circuit-switched cell on which to camp by comparing the current pool id with at least a plural subset of the pool id's stored in the data structure.

18. A base station, comprising:
a radio, comprising one or more antennas for performing wireless communications;
a processor;
a memory medium comprising program instructions executable by the base station, wherein the program instructions are executable to:
receive and store first information, wherein the first information comprises pool id's to identify a plurality of pools within which each of the plurality of cells are operating;
transmit, to a first UE, a request to perform a circuit-switched fallback (CSFB) operation to handle a call;
transmit the first information to the first UE in a radio resource control (RRC) release message;
wherein the first information is useable by the first UE to select a circuit-switched cell on which to camp during the CSFB operation, wherein the circuit-switched cell is selected based on the received first information such that the circuit-switched cell is in the same pool in which the UE was previously operating.

19. The base station of claim 18,
wherein the first information comprises a list of cell frequencies and corresponding pool id's.

20. The base station of claim 19,
wherein each of the pool id's is derived from a Network Resource Information (NRI) field obtained from an MSC server.

* * * * *